(12) United States Patent
Epstein et al.

(10) Patent No.: US 7,903,194 B2
(45) Date of Patent: *Mar. 8, 2011

(54) OPTICAL ELEMENT FOR LATERAL LIGHT SPREADING IN BACK-LIT DISPLAYS AND SYSTEM USING SAME

(75) Inventors: Kenneth A. Epstein, St. Paul, MN (US); Timothy J. Hebrink, Scandia, MN (US); Andrew J. Ouderkirk, Woodbury, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1323 days.

This patent is subject to a terminal disclaimer.

(21) Appl. No.: 11/166,723

(22) Filed: Jun. 24, 2005

(65) Prior Publication Data
US 2006/0290842 A1 Dec. 28, 2006

(51) Int. Cl.
*G02F 1/1335* (2006.01)
(52) U.S. Cl. ................. 349/62; 349/61; 349/64
(58) Field of Classification Search ............... 349/61–67
See application file for complete search history.

(56) References Cited

U.S. PATENT DOCUMENTS

| | | |
|---|---|---|
| 5,422,756 A | 6/1995 | Weber |
| 5,587,816 A | 12/1996 | Gunjima et al. |
| 5,686,979 A | 11/1997 | Weber et al. |
| 5,712,694 A | 1/1998 | Taira et al. |
| 5,751,388 A | 5/1998 | Larson |
| 5,793,456 A | 8/1998 | Broer et al. |
| 5,825,542 A | 10/1998 | Cobb, Jr. et al. |
| 5,825,543 A | 10/1998 | Ouderkirk et al. |
| 5,828,471 A | 10/1998 | Davis et al. |
| 5,828,488 A | 10/1998 | Ouderkirk et al. |
| 5,856,855 A | 1/1999 | Mol et al. |
| 5,867,316 A | 2/1999 | Carlson et al. |

(Continued)

FOREIGN PATENT DOCUMENTS
EP 1 072 637 1/2001
(Continued)

OTHER PUBLICATIONS

"Guideline for the Construction of Thin Light-Boxes using 3M Optical Lighting Film", 3M, St. Paul, Minnesota, Jan. 2000, pp. 1-12.

(Continued)

*Primary Examiner* — David Nelms
*Assistant Examiner* — Nathanael R Briggs
(74) *Attorney, Agent, or Firm* — Jay R. Pralle

(57) ABSTRACT

A display system has a controlled transmission mirror disposed between the light sources and the display panel. The controlled transmission mirror includes a light-diverting input coupling element facing the light sources, a light-diverting output coupling element facing the display panel and a multilayer reflector between the input and output coupling elements. The controlled transmission mirror laterally spreads the light, making the illumination of the panel more uniform. The controlled transmission mirror may include a transparent substrate between the input and output coupling elements for additional light spreading. The light sources may be positioned within the controlled transmission mirror, rather than behind it. The output coupling element can be insensitive to polarization, so the light passing out of the controlled transmission mirror is unpolarized, or the output coupling element can be polarization sensitive so that the output light is polarized.

10 Claims, 10 Drawing Sheets

U.S. PATENT DOCUMENTS

| | | |
|---|---|---|
| 5,882,774 A | 3/1999 | Jonza et al. |
| 5,940,211 A | 8/1999 | Hikmet et al. |
| 5,995,690 A | 11/1999 | Kotz et al. |
| 6,008,871 A | 12/1999 | Okumura |
| 6,011,602 A | 1/2000 | Miyashita et al. |
| 6,024,455 A | 2/2000 | O'Neill et al. |
| 6,099,758 A | 8/2000 | Verrall et al. |
| 6,104,454 A | 8/2000 | Hiyama et al. |
| 6,122,103 A | 9/2000 | Perkins et al. |
| 6,208,466 B1 | 3/2001 | Liu et al. |
| 6,268,961 B1 * | 7/2001 | Nevitt et al. ............... 359/488 |
| 6,515,785 B1 | 2/2003 | Cobb, Jr. et al. |
| 6,531,230 B1 | 3/2003 | Weber et al. |
| 6,590,705 B1 | 7/2003 | Allen et al. |
| RE38,305 E | 11/2003 | Gunjima et al. |
| 7,052,152 B2 | 5/2006 | Harbers et al. |
| 7,259,803 B2 | 8/2007 | Akada et al. |
| 2001/0050816 A1 | 12/2001 | Suzuki et al. |
| 2002/0063817 A1 | 5/2002 | Nauta et al. |
| 2002/0130985 A1 * | 9/2002 | Weindorf et al. ............. 349/61 |
| 2002/0159019 A1 | 10/2002 | Pokorny et al. |
| 2003/0118805 A1 | 6/2003 | Kretman et al. |
| 2003/0164904 A1 | 9/2003 | Grohn et al. |
| 2004/0105055 A1 | 6/2004 | Yu et al. |
| 2004/0105159 A1 | 6/2004 | Saccomanno et al. |
| 2004/0105617 A1 | 6/2004 | Cornelissen et al. |
| 2004/0119910 A1 | 6/2004 | Maeda et al. |
| 2004/0141103 A1 | 7/2004 | Kotchick et al. |
| 2004/0223099 A1 | 11/2004 | Kotchick et al. |
| 2004/0228106 A1 | 11/2004 | Stevenson et al. |
| 2004/0234724 A1 | 11/2004 | Kaminsky et al. |
| 2005/0094401 A1 | 5/2005 | Magarill |
| 2005/0110916 A1 | 5/2005 | Park et al. |
| 2005/0255407 A1 | 11/2005 | Kuwabara |
| 2005/0265029 A1 | 12/2005 | Epstein et al. |
| 2006/0193577 A1 | 8/2006 | Ouderkirk et al. |
| 2006/0193578 A1 | 8/2006 | Ouderkirk et al. |
| 2006/0193589 A1 | 8/2006 | Reker et al. |
| 2006/0290843 A1 | 12/2006 | Epstein et al. |
| 2006/0290844 A1 | 12/2006 | Epstein et al. |
| 2006/0290845 A1 | 12/2006 | Hebrink et al. |
| 2006/0291238 A1 | 12/2006 | Epstein et al. |
| 2007/0030415 A1 * | 2/2007 | Epstein ........................ 349/64 |

FOREIGN PATENT DOCUMENTS

| | | |
|---|---|---|
| EP | 1 341 006 | 9/2003 |
| EP | 1 521 235 | 10/2004 |
| JP | 10-036655 | 2/1998 |
| JP | 2004/114617 | 9/2002 |
| JP | 2004/315544 | 2/2003 |
| JP | 35-044264 | 7/2004 |
| JP | 2004/277657 | 10/2004 |
| WO | WO 95/17303 | 6/1995 |
| WO | WO 99/21913 | 5/1999 |
| WO | WO 99/56158 | 11/1999 |
| WO | WO 00/75560 A1 | 12/2000 |
| WO | WO 01/31393 | 5/2001 |
| WO | WO 02/31053 | 4/2002 |
| WO | WO 2004/068182 A1 | 8/2004 |
| WO | WO 2005/006036 A1 | 1/2005 |
| WO | WO 2006/044475 | 4/2006 |

OTHER PUBLICATIONS

Optical Lighting Film Application Bulletin, "Thin Sign Box Sheets," 3M Specified Construction Products Department, Technical Bulletin, 3M, St. Paul, Minnesota, Feb. 1, 2001, pp. 1-8.

"Uniform Lighting Panel ULP 4X6 V," Consumer Safety and Light Management Department, Technical Specification, 3M, St. Paul, Minnesota, May 9, 2003, 2 pgs.

Kim, GeunHyung, A PMMA Composite as an Optical Diffuse in Liquid Crystal Display Backlighting Unit, Science Direct, European Polymer Journal, Feb. 25, 2005.

* cited by examiner

OPTICAL ELEMENT FOR LATERAL LIGHT SPREADING IN BACK-LIT DISPLAYS AND SYSTEM USING SAME

RELATED APPLICATIONS

This application is related to the following applications, all of which are incorporated herein by reference: U.S. patent application Ser. No. 11/166,722, titled "COLOR MIXING ILLUMINATION LIGHT UNIT AND SYSTEM USING SAME", filed on even date herewith; U.S. patent application Ser. No. 11/167,003, titled "OPTICAL ELEMENT FOR LATERAL LIGHT SPREADING IN EDGE-LIT DISPLAYS AND SYSTEM USING SAME", filed on even date herewith; U.S. patent application Ser. No. 11/167,001, titled "ILLUMINATION ELEMENT AND SYSTEM USING SAME", filed on even date herewith; and U.S. patent application Ser. No. 11/167,019, titled "POLARIZATION SENSITIVE ILLUMINATION ELEMENT AND SYSTEM USING SAME", filed on even date herewith.

FIELD OF THE INVENTION

The invention relates to optical lighting and displays, and more particularly to signs and display systems that are illuminated by direct-lit backlights.

BACKGROUND

Liquid crystal displays (LCDs) are optical displays used in devices such as laptop computers, hand-held calculators, digital watches and televisions. Some LCDs, for example LCD monitors and LCD televisions (LCD-TVs), are directly illuminated using a number of light sources positioned directly behind the LCD panel. This arrangement, commonly referred to as a direct-lit display, is increasingly common with larger displays. One reason for this is that the light power requirements to achieve a certain level of display brightness increase with the square of the display size. On the other hand, the available real estate for locating light sources along the side of the display only increases linearly with display size. Therefore, there comes a point where the light sources have to be placed behind the panel rather than to the side in order to achieve a certain level of brightness. Since some LCD applications, such as LCD-TVs, require that the display be bright enough to be viewed from a greater distance than other applications, and the viewing angle requirements for LCD-TVs can be wider than those for LCD monitors and hand-held devices, it is more common to see LCD-TVs with direct-lit illumination even for relatively small screen size.

Some LCD monitors and most LCD-TVs are illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is commonly used to smooth the illumination profile at the back of the LCD device.

Currently, LCD-TV diffuser plates employ a polymeric matrix of polymethyl methacrylate (PMMA) with a variety of dispersed phases that include glass, polystyrene beads, and $CaCO_3$ particles. These plates often deform or warp after exposure to the elevated temperatures of the lamps. In addition, some diffusion plates are provided with a diffusion characteristic that varies spatially across its width, in an attempt to make the illumination profile at the back of the LCD panel more uniform. Such non-uniform diffusers are sometimes referred to as printed pattern diffusers. They are expensive to manufacture, and increase manufacturing costs, since the diffusing pattern must be registered to the illumination source at the time of assembly. In addition, the diffusion plates require customized extrusion compounding to distribute the diffusing particles uniformly throughout the polymer matrix, which further increases costs.

SUMMARY OF THE INVENTION

One embodiment of the invention is directed to an optical system that includes an image-forming panel having an illumination side and a viewing side, and at least a first light source and a second light source disposed to the illumination side of the image-forming panel. A controlled transmission mirror is located between the image-forming panel and the light sources and includes an input coupling element facing the first and second light sources and an output coupling element facing the image-forming panel. The controlled transmission mirror also includes a first multilayer reflector disposed between the input and output coupling elements and is spaced apart from at least one of the input and output coupling elements. The first multilayer reflector is reflective for normally incident light from the light sources. The input coupling layer redirects at least some of the light propagating from the light sources in a direction substantially perpendicular to the first multilayer reflector into a direction that is transmitted through the first multilayer reflector.

Another embodiment of the invention is directed to an optical system that includes an image-forming panel and at least a first light source disposed behind the image-forming panel. In order from the first light source towards the image forming panel are: a first diffuser, a first multilayer reflector and a second diffuser. At least some light from the first light source passes through the first diffuser, the first multilayer reflector and the second diffuser towards the image-forming panel. An intensity profile of light that has passed out of the second diffuser from the first light source has a minimum at a position along an axis from the first light source normal to a major surface of the first multilayer reflector.

Another embodiment of the invention is directed to a controlled transmission mirror that includes a light-diverting input coupling element, a light diverting output coupling element and a first multilayer reflector, reflective for normally incident light at a first wavelength. The controlled transmission mirror also includes a substrate substantially transparent at the first wavelength. The substrate has a side reflector disposed to reflect light propagating out of a peripheral edge of the substrate. The substrate and the first multilayer reflector are both disposed between the input coupling element and the output coupling element.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
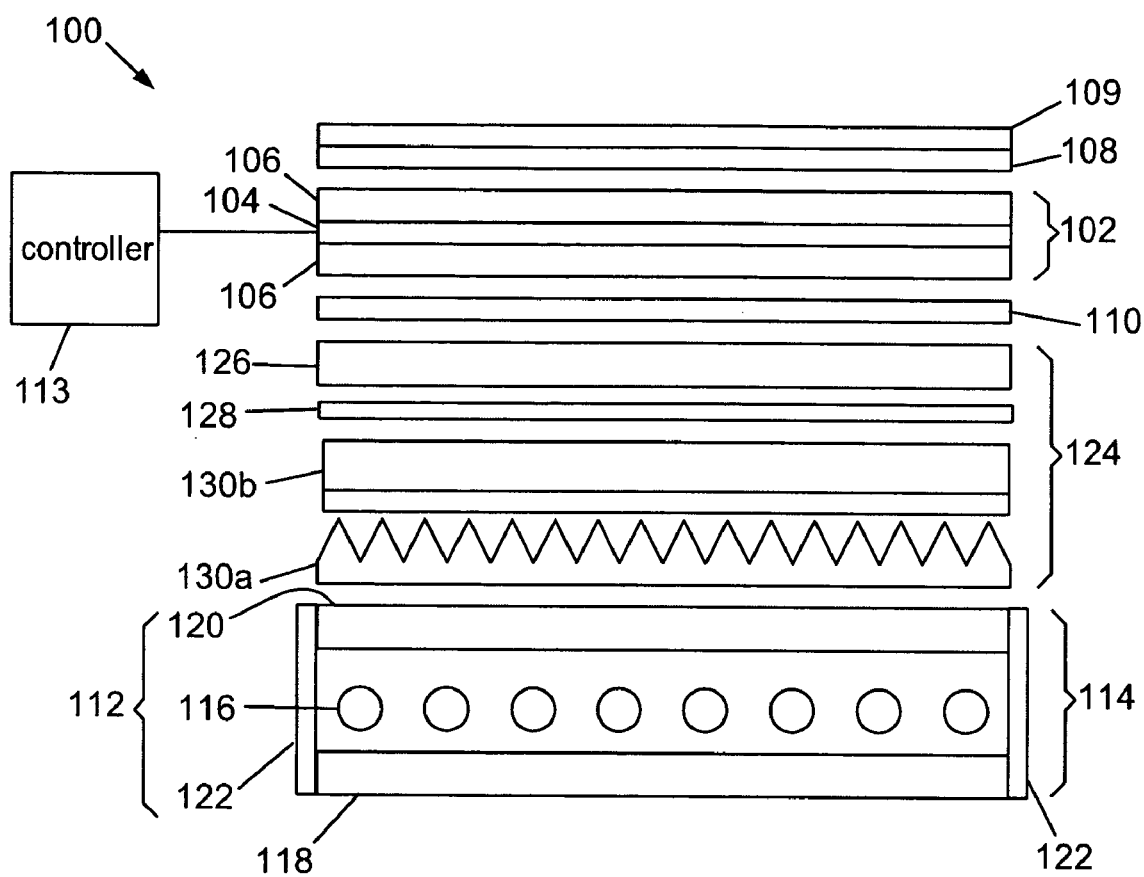
FIG. 1 schematically illustrates a back-lit liquid crystal display device that uses a backlight having a lateral light spreading element according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to illuminated signs and displays, such as liquid crystal displays (LCDs, or LC displays), and is particularly applicable to LCDs that are directly illuminated from behind, known as direct-lit displays. Some illustrative examples of direct-lit displays include some types of LCD monitors and LCD televisions (LCD-TVs).

A schematic exploded view of an exemplary embodiment of a direct-lit display device 100 is presented in FIG. 1. Such a display device 100 may be used, for example, in an LCD monitor or LCD-TV. The device 100 uses a liquid crystal (LC) panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent pixels. A color filter may also be included with one or more of the plates 106 for imposing color on the displayed image.

An upper absorbing polarizer 108 is positioned above the LC layer 104 and a lower absorbing polarizer 110 is positioned below the LC layer 104. In the illustrated embodiment, the upper and lower absorbing polarizers 108, 110 are located outside the LC panel 102. The absorbing polarizers 108, 110 and the LC panel 102, in combination, control the transmission of light from the backlight 112 through the display 100 to the viewer. When a pixel of the LC layer 104 is not activated, it does not change the polarization of light passing therethrough. Accordingly, light that passes through the lower absorbing polarizer 110 is absorbed by the upper absorbing polarizer 108, when the absorbing polarizers 108, 110 are aligned perpendicularly. When the pixel is activated, on the other hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 113, results in the light passing out of the display at certain desired locations, thus forming an image seen by the viewer. The controller 113 may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

Some types of LC displays may operate in a manner different from that described above and, therefore, differ in detail from the described system. For example, the absorbing polarizers may be aligned parallel and the LC panel may rotate the polarization of the light when in an unactivated state. Regardless, the basic structure of such displays remains similar to that described above.

The backlight 112 generates light and directs the light to the back of the LC panel 102. The backlight 112 includes a light mixing cavity 114 that contains a number of light sources 116 for generating the light. The light sources 116 may be linear sources, such as cold cathode, fluorescent tubes. Other types of light source may also be used, such as filament or arc lamps, light emitting diodes (LEDs), organic LEDs (OLEDs), flat fluorescent panels or external fluorescent lamps. This list of light sources is not intended to be limiting or exhaustive, but only exemplary.

The light mixing cavity 114 may include a base reflector 118 that reflects light propagating downwards from the light sources 116, in a direction away from the LC panel 102. The base reflector 118 may also be useful for recycling light within the display device 100, as is explained below. The base reflector 118 may be a specular reflector or may be a diffuse reflector. One example of a specular reflector that may be used as the base reflector 118 is Vikuiti™ Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like. Other examples of diffuse reflectors, including microporous materials and fibril-containing materials, are discussed in co-owned U.S. Patent Application Publication 2003/0118805 A1, incorporated herein by reference.

The light mixing cavity 114 also includes a controlled transmission mirror 120 disposed between the light sources 116 and the LC panel 102. The controlled transmission mirror 120 reflects some of the light within the cavity 114 and permits some light to escape from the cavity 114 after spreading the light laterally from each light source 116. The lateral light spreading aids in making the intensity profile of the light exiting the cavity 114 more uniform, so that the viewer sees a more uniformly illuminated image. In addition, where different light sources 116 produce light of different colors, the lateral light spreading results in more complete mixing of the different colors. The operation of the controlled transmission mirror 120 is discussed in more detail below.

The cavity 114 may also be provided with reflecting walls 122. The reflecting walls 122 may be formed, for example, of the same specular or diffuse reflecting material as is used for the base reflector 118, or of some other type of reflecting material.

An arrangement of light management layers 124 may be positioned between the cavity 114 and the LC panel 102. The light management layers 124 affect the light propagating from the cavity 114 so as to improve the operation of the display device 100. For example, the light management layers 124 may include a reflective polarizer 126. This is useful because the light sources 116 typically produce unpolarized light, whereas the lower absorbing polarizer 110 only transmits a single polarization state. Thus, about half of the light generated by the light sources 116 is not suitable for transmission through to the LC layer 104. The reflecting polarizer 126, however, may be used to reflect the light that would otherwise be absorbed in the lower absorbing polarizer 110, and so this light may be recycled by reflection between the reflecting polarizer 126 and the cavity 114. The light reflected by the reflecting polarizing 126 may be subsequently reflected by the controlled transmission mirror 120 or the light may re-enter the cavity 114 and be reflected by the base reflector 118. At least some of the light reflected by the reflecting polarizer 126 may be depolarized and subsequently returned to the reflecting polarizer 126 in a polarization state that is transmitted through the reflecting polarizer 126 and the lower absorbing polarizer 110 to the LC panel 102. In this manner, the reflecting polarizer 126 may be used to increase the fraction of light emitted by the light sources 116 that reaches the LC panel 102, and so the image produced by the display device 100 is brighter.

Any suitable type of reflective polarizer may be used, for example, multilayer optical film (MOF) reflective polarizers, diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of MOF reflective polarizers include Vikuiti™ DBEF-D200 and DBEF-D400 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multilayer polarizers as described in e.g. co-owned U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizers useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

A polarization mixing layer 128 may be placed between the cavity 114 and the reflecting polarizer 126 to aid in mixing the polarization of the light reflected by the reflecting polarizer 126. For example, the polarization mixing layer 128 may be a birefringent layer such as a quarter-wave retarding layer.

The light management layers 124 may also include one or more brightness enhancing layers 130a, 130b. A brightness enhancing layer is one that includes a surface structure that redirects off-axis light into a propagation direction closer to the axis of the display. This controls the viewing angle of the illumination light passing through the LC panel 102, typically increasing the amount of light propagating on-axis through the LC panel 102. Consequently, the on-axis brightness of the image seen by the viewer is increased.

One example of a brightness enhancing layer has a number of prismatic ridges that redirect the illumination light, through a combination of refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT. Although only one brightness enhancing layer may be used, a common approach is to use two brightness enhancing layers 130a, 130b, with their structures oriented at about 90° to each other. This crossed configuration provides control of the viewing angle of the illumination light in two dimensions, the horizontal and vertical viewing angles.

Figure 2A:
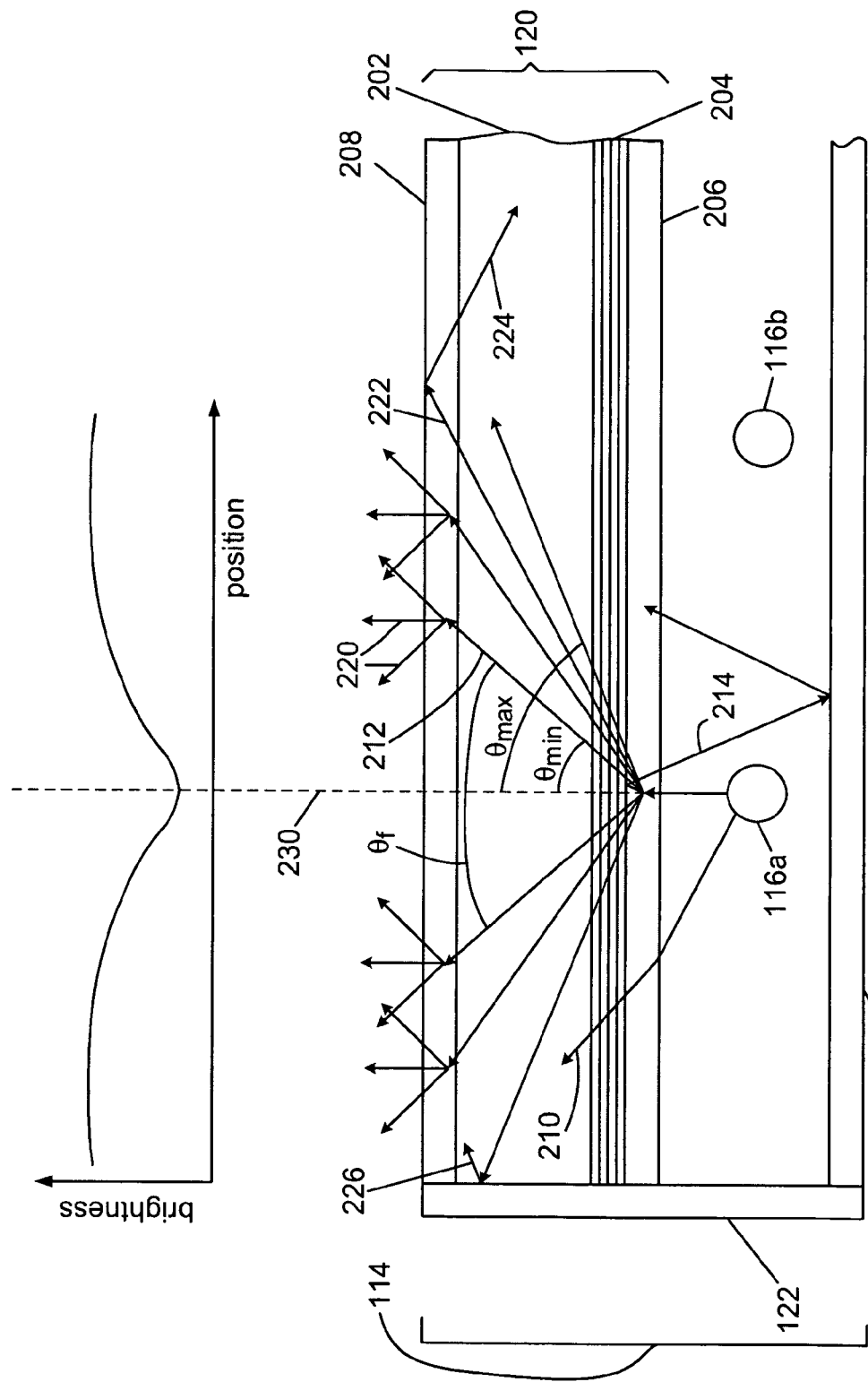
FIGS. 2A and 2B schematically illustrate cross-sectional views of part of embodiments of a controlled transmission mirror according to principles of the present invention.

One particular embodiment of the controlled transmission mirror is now described with reference to FIG. 2A. The figure shows part of the cavity 114, including some light sources 116a, 116b, portions of the base reflector 118 and the controlled transmission mirror 120, and the side reflector 122. The controlled transmission mirror 120 advantageously provides uniform back-illumination for direct-lit displays that use linear light sources, such as CCFLs, or quasi-point light sources, such as LEDs, but may also be used with other types of light sources. The controlled transmission mirror 120 may include a substrate 202 that is substantially transparent to the light generated by the light sources 116a, 116b. A broadband multilayer reflector 204 is disposed on at least one side of the substrate 202. In the illustrated embodiment, the multilayer reflector 204 is disposed on the lower side of the substrate 202. The multilayer reflector 204 may be attached to the substrate 202, for example by lamination, either with or without an adhesive. In the illustrated embodiment, the multilayer reflector 204 is laminated on the side of the substrate 202 facing the light sources 116a, 116b.

The substrate 202 may be formed of any suitable transparent material, organic or inorganic, for example polymer or glass. Suitable polymer materials may be amorphous or semi-crystalline, and may include homopolymer, copolymer or blends thereof. Example polymer materials include, but are not limited to, amorphous polymers such as poly(carbonate) (PC); poly(styrene) (PS); acrylates, for example acrylic sheets as supplied under the ACRYLITE® brand by Cyro Industries, Rockaway, N.J.; acrylic copolymers such as isooctyl acrylate/acrylic acid; poly(methylmethacrylate) (PMMA); PMMA copolymers; cycloolefins; cylcoolefin copolymers; acrylonitrile butadiene styrene (ABS); styrene acrylonitrile copolymers (SAN); epoxies; poly(vinylcyclohexane); PMMA/poly(vinylfluoride) blends; atactic poly(propylene); poly(phenylene oxide) alloys; styrenic block copolymers; polyimide; polysulfone; poly(vinyl chloride); poly(dimethyl siloxane) (PDMS); polyurethanes; and semi-crystalline polymers such as poly(ethylene); poly(propylene); poly(ethylene terephthalate) (PET); poly(carbonate)/aliphatic PET blends; poly(ethylene naphthalate) (PEN);

polyamides; ionomers; vinyl acetate/polyethylene copolymers; cellulose acetate; cellulose acetate butyrate; fluoropolymers; poly(styrene)-poly(ethylene) copolymers; PET and PEN copolymers, and clear fiberglass panels. Some of these materials, for example PET, PEN and copolymers thereof, may be oriented so as to change the material refractive index from that of the isotropic material.

An input coupling element 206 is disposed at the lower side of the multilayer reflector 204 and an output coupling element 208 is disposed at the upper side of the substrate 202. The input coupling element 206 and output coupling element 208 are used to change direction of at least some of the light entering these coupling elements 206, 208, so as to couple light into the controlled transmission mirror 120 or to couple light out of the controlled transmission mirror 120. Exemplary embodiments of input coupling elements 206 and output coupling elements 208 include diffusers, both surface and bulk diffusers, and microreplicated surfaces. Some exemplary embodiments of input coupling elements 206 and output coupling elements 208 are described in greater detail below. The output coupling element 208 may be the same as the input coupling element 206, for example the input and output coupling elements 206, 208 may both be bulk diffusers, or may be different from the input coupling element 206. The input and output coupling elements 206, 208 may be laminated or otherwise formed integrally with the substrate 202 and the multilayer reflector 204.

The multilayer dielectric reflector 204 is generally constructed of optical repeating units that form the basic building blocks of a dielectric stack. The optical repeating units typically include two or more layers of at least a high and a low refractive index material. A multilayer reflector can be designed, using these building blocks, to reflect infrared, visible or ultraviolet wavelengths and one or both of a given orthogonal pair of polarizations of light. In general, the stack can be constructed to reflect light of a particular wavelength, $\lambda$, by controlling the optical thickness of the layers according to the relationship:

$$\lambda = (2/M)*D_r,$$

where M is an integer representing the order of the reflected light, and $D_r$ is the optical thickness of an optical repeating unit. For the first order reflection (M=1), the optical repeating unit has an optical thickness of $\lambda/2$. Simple ¼-wave stacks include a number of layers, where each layer has an optical thickness of $\lambda/4$. Broadband reflectors can include multiple ¼-wave stacks tuned to various wavelengths, a stack with a continuous gradation of the layer thickness throughout the stack, or combinations thereof. A multilayer reflector may further include non-optical layers. For example, a coextruded polymeric dielectric reflector may include protective boundary layers and/or skin layers used to facilitate formation of the reflector film and to protect the reflector. Polymeric optical stacks particularly suited to the present invention are described in published PCT Patent Application WO 95/17303, entitled Multilayer Optical Film and U.S. Pat. No. 6,531,230, incorporated herein by reference. In other embodiments, the dielectric stack may be a stack of inorganic materials. Some suitable materials used for the low refractive index material include $SiO_2$, $MgF_2$ and $CaF_2$ and the like. Some suitable materials used for the high refractive index material include $TiO_2$, $Ta_2O_5$, ZnSe and the like. The invention is not limited to quarter-wave stacks, however, and is more generally applicable to any dielectric stack including, for example, computer optimized stacks and random layer thickness stacks.

Reflection by a dielectric stack of light at a particular wavelength is dependent, in part, on the propagation angle through the stack. The multilayer reflector may be considered as having a reflection band profile (e.g., band center and bandedges) for light propagating in the stack at a particular angle. This band profile changes as the angle of propagation in the stack changes. The propagation angle in the stack is generally a function of the incident angle and the refractive indices of the materials in the stack and the surrounding medium. The wavelength of the bandedge of the reflection band profile changes as the propagation angle in the stack changes. Typically, for the polymeric materials under consideration, the bandedge of the reflector for light at normal incidence shifts to about 80% of its normal incidence value when viewed at grazing incidence in air. This effect is described in greater detail in U.S. Pat. No. 6,208,466, incorporated herein by reference. The bandedge may shift considerably further when the light is coupled into the reflector using a medium having a refractive index higher than air. Also, the shift in the bandedge is typically greater for p-polarization light than for s-polarization light.

The angular dependence of the reflection band profile (e.g., bandedge shifting with angle) results from a change in the effective layer thickness. The reflection band shifts towards shorter wavelengths as the angle increases from normal incidence. While the total path length through a given layer increases with angle, the change in band position with angle does not depend on the change in the total path length through a layer with angle. Rather, the band position depends on the difference in path length between light rays reflected from the top and bottom surfaces of a given layer. This path difference decreases with angle of incidence as shown by the familiar formula $n.d.\cos\theta$, which is used to calculate the wavelength, $\lambda$, to which a given layer is tuned as a $\lambda/4$ thick layer, where n is the refractive index of the layer and $\theta$ is the propagation angle of the light relative to a normal to the layer.

The above description describes how the bandedge of the reflection band profile changes as a function of angle. As used herein, the term bandedge generally refers to the region where the multilayer reflector changes from substantial reflection to substantial transmission. This region may be fairly sharp and described as a single wavelength. In other cases, the transition between reflection and transmission may be more gradual and may be described in terms of a center wavelength and bandwidth. In either case, however, a substantial difference between reflection and transmission exists on either side of the bandedge.

As light at the particular wavelength propagates in the stack at increasing propagation angles (measured from an axis normal to the interface of the repeating units), the light approaches the bandedge. In one example, at high enough propagation angles, the stack will become substantially transparent to that particular wavelength of light and the light will transmit through the stack. Thus, for a given wavelength of light, the stack has an associated propagation angle below which the stack substantially reflects the light and another propagation angle, above which the stack substantially transmits the light. Accordingly, in certain multilayer stacks, each wavelength of light may be considered as having a corresponding angle below which substantial reflection occurs and a corresponding angle above which substantial transmission occurs. The sharper the bandedge, the closer these two angles are for the associated wavelength. For the purposes of the present description, the approximation is made that these two angles are the same, and have a value of $\theta_{min}$.

The above description describes the manner in which monochromatic light in a given stack shifts from reflection to transmission with increasing angle of propagation. If the stack is illuminated with light having a mixture of components at different wavelengths, the angle, $\theta_{min}$, at which the reflective stack changes from being reflective to transmissive is different for the different wavelength components. Since the bandedge moves to shorter wavelengths with increasing angle, the value of $\theta_{min}$ is lower for light at longer wavelengths, potentially allowing the more light at longer wavelengths to be transmitted through the multilayer reflector than at shorter wavelengths. In some embodiments it is desired that the color of the light passing out of the controlled transmission mirror be relatively uniform. One approach to balancing the color is to use an input and output coupling element that couples more light at shorter wavelengths than at longer wavelengths into the controlled transmission mirror.

One example of such a coupling element is a bulk diffuser that contains scattering particles dispersed within a polymer matrix, as is discussed below with regards to FIGS. 4A and 5A. The scattering particles have a refractive index different from the surrounding matrix. The nature of diffusive scattering is that, all else being equal, light at shorter wavelengths is scattered more than light at longer wavelengths.

In addition, the degree of scattering is dependent on the difference between the refractive indices of the particles and the surrounding matrix. If the difference in refractive index is greater at shorter wavelengths, then even more short wavelength light is scattered. In one particular embodiment of a diffusive coupling element, the matrix is formed of biaxially stretched PEN, which has an in-plane refractive index of about 1.75 for red light and about 1.85 for blue light, where the light is s-polarized, i.e., has high dispersion. The in-plane refractive index is the refractive index for light whose electric vector is polarized parallel to the plane of the film. The out-of-plane refractive index, for light polarized parallel to the thickness direction of the film, is about 1.5. The refractive index for p-polarized light is lower than that of the s-polarized light, since the p-polarized light experiences an effective refractive index that is a combination of the in-plane refractive index and the out-of-plane refractive index. The particles in the matrix may have a high refractive index, for example titanium dioxide ($TiO_2$) particles have a refractive index of about 2.5. The refractive index of $TiO_2$ varies by approximately 0.25 over the range 450 nm-650 nm, which is greater than the approximately 0.1 refractive index variation for PEN over a similar wavelength range. Thus, the refractive index difference between the particles and the matrix changes by about 0.15 across the visible spectrum, resulting in increased scattering for the blue light. Consequently, the refractive index difference between the particles and the matrix can vary significantly over the visible spectrum.

Thus, due to the wavelength dependence of the diffusive scattering mechanism and the large difference in the refractive index difference over the visible spectrum, the degree to which blue light is scattered into the multilayer reflector is relatively high, which at least partially compensates for the larger value of $\theta_{min}$ at shorter wavelengths.

Other embodiments of input and output coupling elements, for example those described below with reference to FIGS. 4B-4D and 5B-5D, rely primarily on refractive effects for diverting the light. For example, a coupling element may be provided with a surface structure or holographic features for coupling the light into or out of the multilayer reflector. Normal material dispersion results in greater refractive effects for shorter wavelengths. Therefore, input and output coupling elements that rely on refractive effects may also at least partially compensate for the larger value of $\theta_{min}$ at shorter wavelengths.

With the understanding, therefore, that the light entering the controlled transmission mirror may have a wide variation in the value of $\theta_{min}$, the following description refers to only a single value of $\theta_{min}$, for simplicity.

Another effect that the system designer can use to control the amount of light passing through the multilayer reflector is the selection of a Brewster's angle, the angle at which p-polarized light passes through the multilayer reflector without reflective loss. For adjacent isotropic layers 1 and 2 in the multilayer reflector, having refractive indices n1 and n2 respectively, the value of Brewster's angle in layer 1, $\theta_B$, for light passing from layer 1 to layer 2, is given by the expression $\tan \theta_B = n2/n1$. Thus, the particular materials employed in the different layers of the multilayer reflector may be selected to provide a desired value of Brewster's angle.

The existence of the Brewster's angle for a multilayer reflector provides another mechanism for allowing light to pass through the reflector other than relying on the input and output coupling layers to divert the light through large angles. As the angle within the controlled transmission mirror is increased for p-polarized light, the reflection band substantially disappears at Brewster's angle. At angles above the Brewster's angle, the reflection band reappears and continues to shift to shorter wavelengths.

In certain embodiments, it may be possible to set the value of $\theta_B$ for blue light to be less than $\theta_{min}$, but have $\theta_B$ be greater than $\theta_{min}$ for red light. This configuration may lead to an increased transmission for blue light through the multilayer reflector, which compensates at least in part for the higher value of $\theta_{min}$ for shorter wavelength light.

At least some of the light from the light source 116a propagates towards the controlled transmission mirror 120. A portion of the light, exemplified by light ray 210, passes through the input coupling element 206 and is incident on the multilayer reflector 204 at an angle greater than $\theta_{min}$ and is transmitted into the substrate 202. Angles are described herein as the angle relative to a normal 230 to the multilayer reflector 204. Another portion of the light, exemplified by light ray 212, is incident at the input coupling element 206 at an angle less than $\theta_{min}$, but is diverted by the input coupling element 206 to an angle of at least $\theta_{min}$, and is transmitted through the multilayer reflector 204 into the substrate 202. Another portion of light from the light source 116a, exemplified by light ray 214, passes through the input coupling element 206 and is incident at the multilayer reflector 204 at an angle that is less than $\theta_{min}$. Consequently, light 214 is reflected by the multilayer reflector 204. The value of $\theta_{min}$ is determined by how far the bandedge of the multilayer reflector 204 shifts before light at the wavelength emitted by the light source 116a is transmitted through the multilayer reflector 204.

In some embodiments it is desired that the multilayer reflector 204 is attached to the substrate 202 in a manner that avoids a layer of air, or some other material of a relatively low refractive index, between the multilayer reflector 204 and substrate 202. Such close optical coupling between the substrate 202 and the multilayer reflector 204 reduces the possibility of total internal reflection of light at the multilayer reflector 204 before reaching the substrate 202.

The maximum angle of the light within the substrate, $\theta_{max}$, is determined by the relative refractive indices of the input coupling element 206, $n_i$, and the substrate 202, $n_s$. Where the input coupling element 206 is a surface coupling element, the value of $n_i$ is equal to the refractive index of the material on which the surface is formed. Propagation from the input coupling element 206 into the substrate 202 is subject to Snell's law. If the light is assumed to be incident at the interface between the input coupling element 206 and the substrate 202 at grazing incidence, close to 90°, then the value of $\theta_{max}$ is given by the expression:

$$\theta_{max}=\sin^{-1}(n_i/n_s).$$

Thus, the light can propagate along the substrate 202 in a direction of $\theta$=90° where the value of $n_s$ is equal to that of $n_i$, or less. Higher values of $\theta_{max}$ may lead to increased lateral spreading of the light, and thus to increased brightness uniformity.

The output coupling element 208 is used to extract at least some of the light out of the controlled transmission mirror 200. For example, some of light 212 may be diffused by the output coupling element 208 so as to pass out of the controlled transmission mirror 120 as light 220.

Other portions of the light within the substrate, for example ray 222, may not be diverted by the output coupling element 208. If light 222 is incident at the upper surface of the output coupling element 208 at an angle greater than the critical angle of the output coupling element, $\theta_c=\sin^{-1}(1/n_e)$, where $n_e$ is the refractive index of the output coupling element, then the light 222 is totally internally reflected within the output coupling element 208 and redirected towards the substrate 202 as light 224. The reflected light 224 may subsequently be totally internally reflected at the lower surface of the input coupling element 206. Alternatively, the light 224 may subsequently be diverted by the input coupling element 206 and pass out of the controlled transmission mirror 120 towards the base reflector 118.

If the light that passes into the substrate 202 with an angle of at least $\theta_{min}$ is incident at the output coupling element 208 with an angle greater than $\theta_c$, then that light which is not diverted out of the output coupling element 208 is typically totally internally reflected within the output coupling element 208. If, however, the light that passes into the substrate with an angle of $\theta_{min}$ reaches the output coupling element 208 at a propagation angle less than $\theta_c$ then a fraction of that light may be transmitted out through the output coupling element 208, even without being diverted by the output coupling element 208, subject to Fresnel reflection loss at the interface between the output coupling element 208 and the air. Thus, there are many possibilities for the light to suffer multiple reflections and for its direction to be diverted within the cavity 114. The light may also propagate transversely within the substrate 202 and/or within the space between the controlled transmission mirror 120 and the base reflector 118. These multiple effects combine to increase the likelihood that the light is spread laterally and extracted to produce a backlight illuminance of more uniform brightness.

Except for the possibility that the multilayer reflector has a value of Brewster's angle, $\theta_B$, that is lower than $\theta_{min}$, there is a forbidden angular region, $\theta_f$, for light originating at the light source 116a. This forbidden angular region, $\theta_f$, has a half-angle of $\theta_{min}$, and is located above the light source 116a. Light cannot pass through the multilayer reflector 122 within the forbidden angular region. This is schematically illustrated in the graph shown above the controlled transmission mirror 120. The graph illustrates a qualitative brightness curve for light emitted from the light source 116a, with a minimum at a position directly above the light source 116a, at a position corresponding to the axis 230. The dark region above the light source 116a is seen only if there is light from no other light source. However, light from neighboring light sources, for example light source 116b, is able to escape from the controlled transmission mirror 120 at a point perpendicularly above light source 116a, at the axis 230, and so a backlight using this controlled transmission mirror 120 is effective at mixing light from different light sources.

One or more of the edges of the substrate 202 may be covered by a reflector 122. Thus, light that might otherwise escape from the substrate 202 is reflected, as light 226, back into the substrate 202 and may be extracted from the controlled transmission mirror 120 as useful illumination light. The reflector 122 may be any suitable type of reflector, including a multilayer dielectric reflector, a metal coating on the edge of the substrate 202, a multilayer polymer reflector, a diffuse polymer reflector, or the like. In the illustrated embodiment, the reflector 120 at the side of the substrate 202 is the same reflector as is used around the sides of the light mixing cavity 114, although this is not intended to be a limitation of the invention and the reflector around the edge of the substrate 202 may be different from the side reflector of the mixing cavity 114.

In view of the description of the controlled transmission mirror provided above, it can be seen that the function of the input coupling element 206 is to divert at least some light, which would otherwise be incident at the multilayer reflector 204 at an angle less than $\theta_{min}$, so as to be incident at the multilayer reflector 204 at an angle of at least $\theta_{min}$. Also, the function of the output coupling element 208 is to divert at least some light, which would otherwise be totally internally reflected within the controlled transmission mirror 120, so as to pass out of the controlled transmission mirror 120.

Figure 2B:
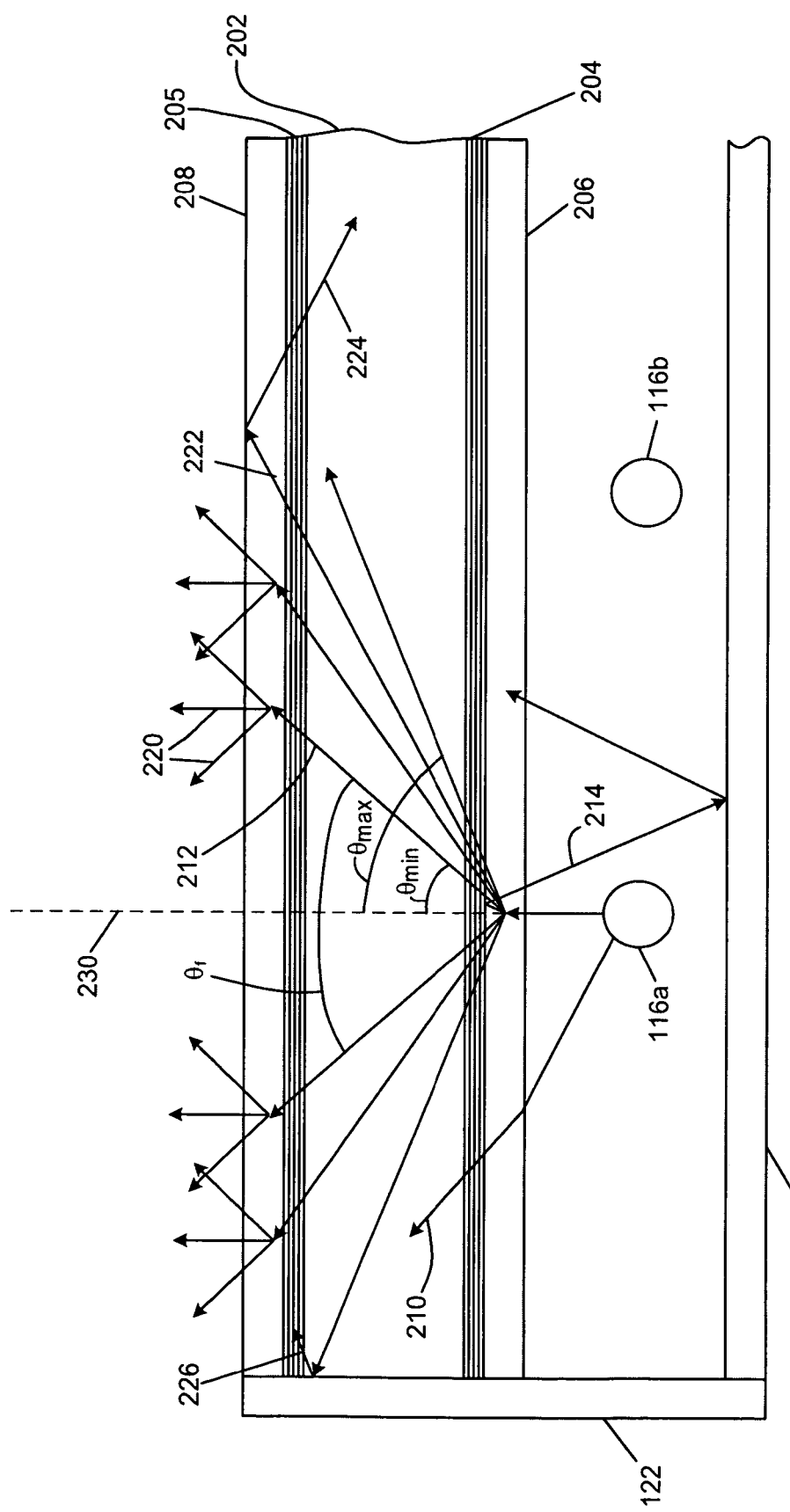

The controlled transmission mirror 120 may optionally be provided with two multilayer reflectors 204, 205, positioned on either side of the substrate 202, as is schematically illustrated in FIG. 2B. The multilayer reflectors 204, 205 preferably have the same value of $\theta_{min}$, although this is not required.

Figure 3:
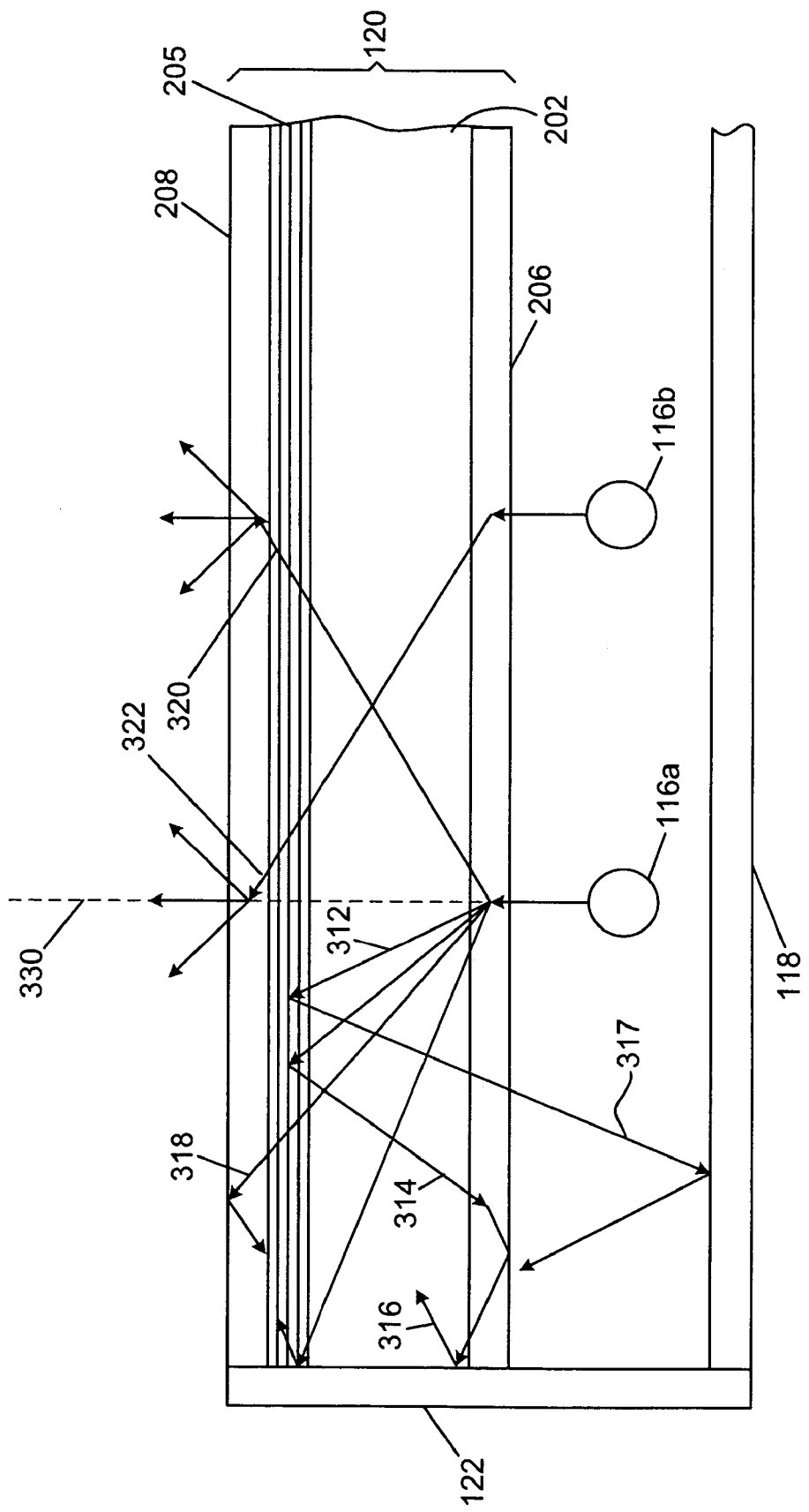
FIG. 3 schematically illustrates a cross-sectional view of part of another embodiment of a controlled transmission mirror according to principles of the present invention.

The controlled transmission mirror may also have a single multilayer reflector positioned on the side of the substrate 202 away from the light sources 116 while remaining effective at controlling the angular range of light that propagates within the controlled transmission mirror 120. An exemplary embodiment of such an arrangement is schematically illustrated in FIG. 3. Where light 312 from the light source 116a is incident on the multilayer reflector 205 at an angle less than $\theta_{min}$, the light is reflected by the multilayer reflector 205 and may pass back out of the input coupling element 206 as light 317. Light reflected by the multilayer reflector 205 may also be diverted by the input coupling element 206 so that it is returned to the substrate 202 at a greater angle. For example, light ray 314 is diverted by the input coupling element 205 and is subsequently totally internally reflected at the lower surface of the input coupling element 204 back into the substrate 202. The totally internally reflected ray 316 may subsequently be returned to the multilayer reflector 205 at an angle greater than $\theta_{min}$, and be transmitted through the multilayer reflector 205.

Other light from the light source 116a may be incident at the multilayer reflector 205 at an angle greater than $\theta_{min}$ and is, therefore, transmitted through the multilayer reflector 205 to the output coupling element 208. The light may be totally internally reflected at the surface of the output coupling element 208, for example as with exemplary ray 318, or may be diverted out of the output coupling element 208, for example as with exemplary ray 320.

While very little if any light from the light source 116 escapes from the controlled transmission mirror 120 perpendicularly above the light source 116a, i.e., along axis 330 or at angles close to axis 330, light from adjacent light sources, for example, light source 116b, may escape from the controlled transmission mirror 120 directly above the light source 116a, i.e., at or close to axis 330. If the light sources 116a, 116b are spaced too closely together, then the "forbidden regions" of each light source 116a, 116b may overlap, thus creating a region of the controlled transmission mirror 120 where no light is extracted, at least from light sources 116a, 116b. It is, therefore, preferred to space adjacent light sources 116a, 116b with a separation, d, having a value of at least about $d=h.\tan(\theta_{min})$, where h is the thickness of the substrate 202. This expression is only approximate, since it assumes that the thickness of the substrate 202 is so much greater than the thicknesses of the multilayer reflector 205, the input coupling element 206 and output coupling element 208 that the thicknesses of these layers 205, 206, 208 may be ignored. This relationship between the spacing of adjacent light sources 116a, 116b and the thickness of the substrate 202 is relevant when it is required that light from one light source be extracted above its nearest neighbor light source. Other conditions may be selected for designing the light extraction element. For example, the light extraction element may be designed so that light from one light source is not extracted above its nearest neighbor light source, but above the second nearest neighbor light source.

Exemplary embodiments of different types of input coupling elements are now discussed with reference to FIGS. 4A-4D. In these embodiments, the multilayer reflector 404 lies between the substrate and the input coupling element 406. In other exemplary embodiments, not illustrated, the substrate may lie between the input coupling element and the multilayer reflector.

Figure 4A:
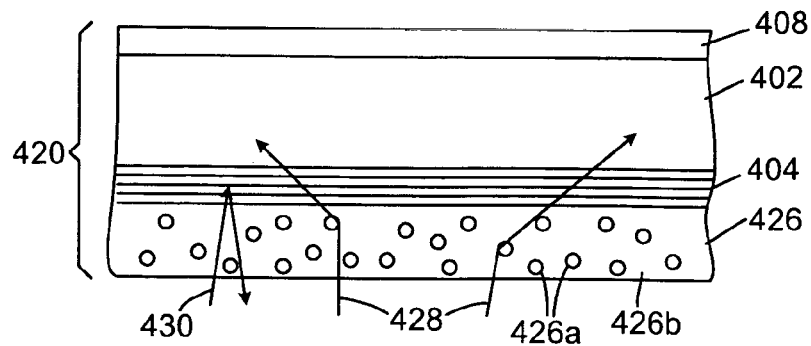
FIGS. 4A-4D schematically illustrate cross-sectional views of different embodiments of input coupling elements for a controlled transmission mirror, according to principles of the present invention.
Figure 5A:
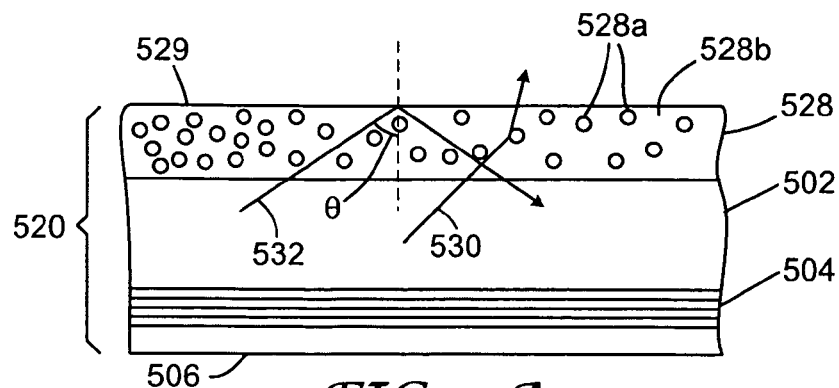
FIGS. 5A-5D schematically illustrate cross-sectional views of different embodiments of output coupling elements for a controlled transmission mirror, according to principles of the present invention.

In FIG. 4A, an exemplary embodiment of a controlled transmission mirror 420 comprises an input coupling element 426, a multilayer reflector 404, a substrate 402 and an output coupling element 408. In this particular embodiment, the input coupling element 426 is a bulk diffusing layer, comprising diffusing particles 426a dispersed within a transparent matrix 426b. At least some of the light entering the input coupling element 426 at an angle less than $\theta_{min}$, for example light rays 428, is scattered within the input coupling element 426 at an angle greater than $\theta_{min}$, and is consequently transmitted through the multilayer reflector 404. Some light, for example ray 430, may not be scattered within the input coupling element 426 through a sufficient angle to pass through the multilayer reflector 404, and is reflected by the multilayer reflector 404. Suitable materials for the transparent matrix 426b include, but are not limited to, polymers such as those listed herein as being suitable for use in a substrate.

The diffusing particles 426a may be any type of particle useful for diffusing light, for example, transparent particles whose refractive index is different from the surrounding polymer matrix, diffusely reflective particles, or voids or bubbles in the matrix 426b. Examples of suitable transparent particles include solid or hollow inorganic particles, for example glass beads or glass shells, solid or hollow polymeric particles, for example solid polymeric spheres or polymeric hollow shells. Examples of suitable diffusely reflecting particles include particles of titanium dioxide ($TiO_2$), calcium carbonate ($CaCO_3$), barium sulphate ($BaSO_4$), magnesium sulphate ($MgSO_4$) and the like. In addition, voids in the matrix 426b may be used for diffusing the light. Such voids may be filled with a gas, for example air or carbon dioxide.

Figure 4B:
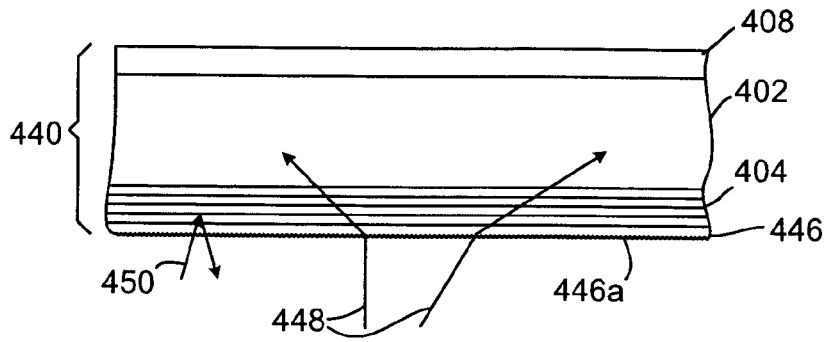

Another exemplary embodiment of a controlled transmission mirror 440 is schematically illustrated in FIG. 4B, in which the input coupling element 446 comprises a surface diffuser 446a. The surface diffuser 446a may be provided on the bottom layer of the multilayer reflector 404 or on a separate layer attached to the multilayer reflector 404. The surface diffuser 446a may be molded, impressed, cast or otherwise prepared.

At least some of the light incident at the input coupling element 446, for example light rays 448, is scattered by the surface diffuser 446a to propagate an angle greater than $\theta_{min}$, and is consequently transmitted through the multilayer reflector 404. Some light, for example ray 450, may not be scattered by the surface diffuser 446a through a sufficient angle to pass through the multilayer reflector 404, and is reflected.

Figure 4C:
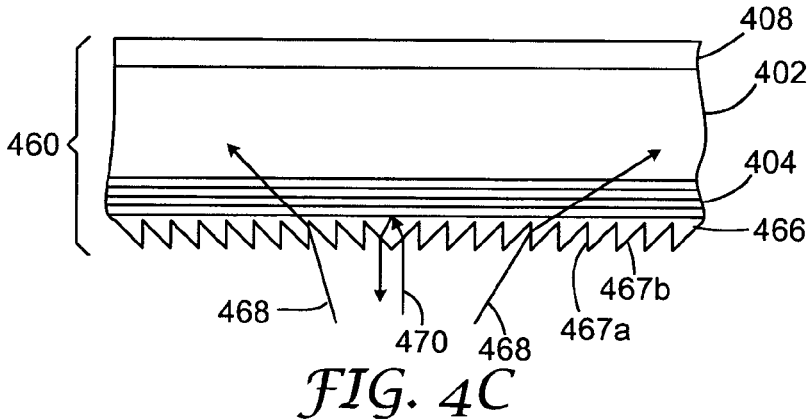

Another exemplary embodiment of a controlled transmission mirror 460 is schematically illustrated in FIG. 4C, in which the input coupling element 466 comprises a microreplicated structure 467 having facets 467a and 467b. The structure 467 may be provided on the bottom layer of the multilayer reflector 404 or on a separate layer attached to the multilayer reflector 404. The structure 467 is different from the surface diffuser 448 in that the surface diffuser 448 includes a mostly random surface structure, whereas the structure 467 includes more regular structures with the defined facets 467a, 467b.

At least some of the light incident at the input coupling element 466, for example rays 468 incident on facets 467a, would not reach the multilayer reflector 404 at an angle of $\theta_{min}$ but for refraction at the facet 467a. Accordingly, light rays 468 are transmitted through the multilayer reflector 404. Some light, for example ray 470, is refracted by facet 467b to an angle less than $\theta_{min}$, and is, therefore, reflected by the multilayer reflector 404.

Figure 4D:
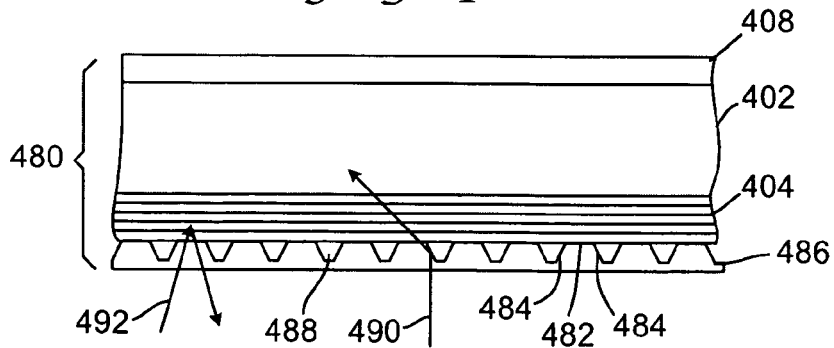

Another exemplary embodiment of a controlled transmission mirror 480 is schematically illustrated in FIG. 4D, in which the input coupling element 486 has surface portions 482 in optical contact with the multilayer reflector 404 and other surface portions 484 that do not make optical contact with the multilayer reflector 404, with a gap 488 being formed between the element 486 and the multilayer reflector 404. The presence of the gap 488 provides for total internal reflection (TIR) of some of the incident light. This type of coupling element may be referred to as a TIR input coupling element.

At least some of the light incident at the input coupling element 486, for example ray 490 incident on the non-contacting surface portions 484 would not reach the multilayer reflector 404 at an angle of $\theta_{min}$ but for internal reflection at the surface 484. Accordingly, light ray 490 may be transmitted through the multilayer reflector 404. Some light, for example ray 492, may be transmitted through the contacting surface portion 482 to the multilayer reflector 404. This light is incident at the multilayer reflector 404 at an angle less than $\theta_{min}$, and so is reflected by the multilayer reflector 404.

Other types of TIR input coupling elements are described in greater detail in U.S. Pat. No. 5,995,690, incorporated herein by reference.

Other types of input coupling elements may be used in addition to those described in detail here, for example, input coupling elements that include a surface or a volume hologram. Also, an input coupling element may combine different approaches for diverting light. For example, an input coupling element may combine a surface treatment, such as a surface structure, surface scattering pattern or surface hologram, with bulk diffusing particles.

It may be desired in some embodiments for the refractive index of the input coupling element and output coupling element to each have a relatively high refractive index, for example, comparable to or higher than the average refractive index (the average of the refractive indices of the high index and low index layers) of the multilayer reflector 404. A higher refractive index for the input and output coupling elements helps to increase the angle at which light may propagate through the multilayer reflector 404, which leads to a greater bandedge shift. This, in turn, may increase the amount of short wavelength light that passes through the controlled transmission mirror, thus making the color of the backlight illumination more uniform. Examples of suitable high refractive index polymer materials that may be used for input and output coupling elements include biaxially stretched PEN and PET which, depending on the amount of stretch, can have in-plane refractive index values of 1.75 and 1.65 respectively for a wavelength of 633 nm.

Commensurate with the choice of materials for the input and output coupling elements, the substrate should be chosen to have an index that does not cause TIR that would block prohibitive amounts of light entering or exiting at large angles. Conversely, a low index for the substrate would result in high angles of propagation in the substrate after injection from the input coupling element having a higher index than the substrate. These two effects can be chosen to optimize the performance of the system with respect to color balance and lateral spreading of the light.

Similar approaches may be used for the output coupling element. For example, a controlled transmission mirror 520 is schematically illustrated in FIG. 5A as having an input coupling element 506, a multilayer reflector 504, a substrate 502 and an output coupling element 528. In this particular embodiment, the output coupling element 528 is a bulk diffusing layer, comprising diffusing particles 528a dispersed within a transparent matrix 528b. Suitable materials for use as the diffusing particles 528a and the matrix 528b are discussed above with respect to the input coupling element 426 of FIG. 4A.

At least some of the light entering the output coupling element 528 from the substrate 502, for example light ray 530, may be scattered by the diffusing particles 528a in the output coupling element 508 and consequently transmitted out of the light output coupling element 528. Some light, for example ray 532, may not be scattered within the output coupling element 528 and is incident at the top surface 529 of the output coupling element 528 at an incident angle of θ. If the value of θ is equal to or greater than the critical angle, $\theta_c$, for the material of the matrix 528b, then the light 532 is totally internally reflected at the surface 529, as illustrated.

Figure 5B:
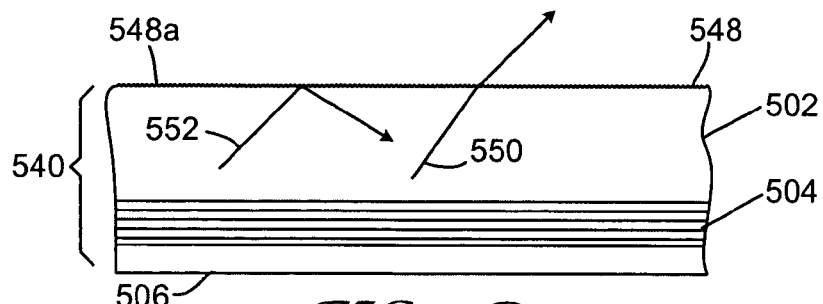

Another exemplary embodiment of controlled transmission mirror 540 is schematically illustrated in FIG. 5B, in which the output coupling element 548 comprises a surface diffuser 548a. The surface diffuser 548a may be provided on the upper surface of the substrate 502, as illustrated, or on a separate layer attached to the substrate 502.

Some light propagating within the substrate 502, for example light 550, is incident at the surface diffuser 548a and is scattered out of the light mixing layer 540. Some other light, for example light 552, may not be scattered by the surface diffuser 548a. Depending on the angle of incidence at the surface diffuser 548a, the light 552 may be totally internally reflected, as illustrated, or some light may be transmitted out of the controlled transmission mirror 540 while some is reflected back within the substrate 502.

Figure 5C:
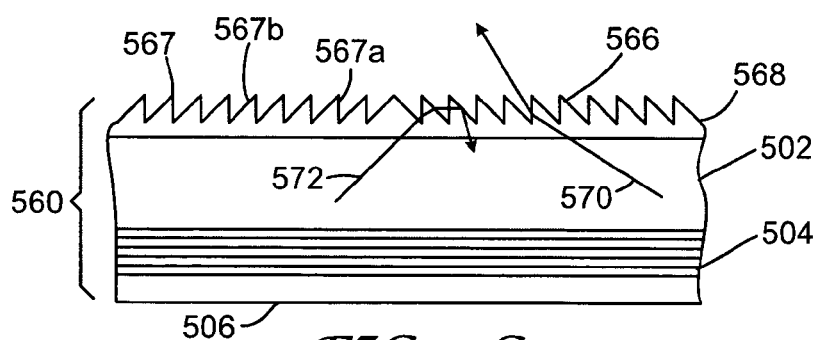

Another exemplary embodiment of controlled transmission mirror 560 is schematically illustrated in FIG. 5C, in which the output coupling element 566 comprises a microreplicated structure 567 having facets 567a and 567b. The structure 567 may be provided on a separate layer 568 attached to the substrate 502, as illustrated, or integral with the top surface of the substrate 502 itself. The structure 567 is different from the surface diffuser 548a in that the surface diffuser includes a mostly random surface structure, whereas the structure 567 includes more regular structures with the defined facets 567a, 567b.

Some light propagating within the substrate 502, for example light 570, is incident at the surface diffuser structure 567 and is refracted out of the light mixing layer 560. Some other light, for example light 572, may not be refracted out of the light mixing layer 560 by the structure 567, but may be returned to the substrate 502. The particular range of propagation angles for light to escape from the light mixing layer 560 is dependent on a number of factors, including at least the refractive indices of the different layers that make up the light mixing layer 560 and the shape of the structure 567.

Figure 5D:
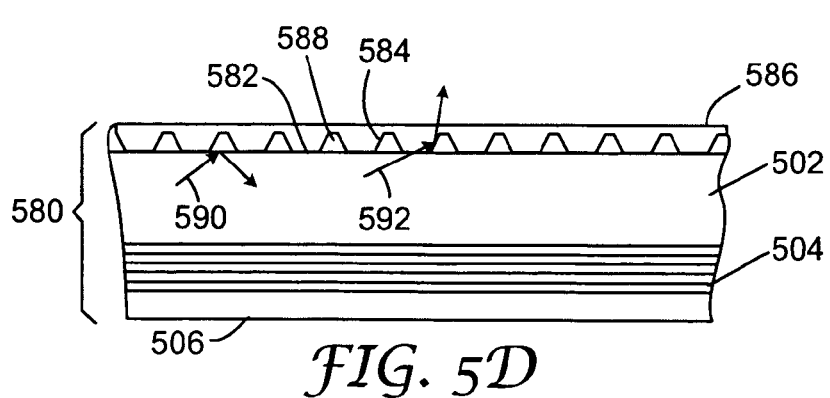

Another exemplary embodiment of a controlled transmission mirror 580 is schematically illustrated in FIG. 5D, in which the output coupling element 586 comprises a light coupling tape that has surface portions 582 in optical contact with the multilayer reflector 504 and other surface portions 584 that do not make optical contact with the multilayer reflector 504, forming a gap 588 between the element 586 and the substrate 502.

At least some of the light incident at the output coupling element 586, for example light ray 590, is incident at a portion of the multilayer reflector's surface that is not contacted to the output coupling element 586, but is adjacent to a gap 588, and so the light 590 is totally internally reflected within the substrate 502. Some light, for example ray 592, may be transmitted through the contacting surface portion 582, and be totally internally reflected at the non-contacting surface portion 584, and so is coupled out of the controlled transmission mirror 580.

Other types of output coupling elements may be used in addition to those described in detail here. Also, an output coupling element may combine different approaches for diverting light out of the controlled transmission mirror. For example, an output coupling element may combine a surface treatment, such as a surface structure or surface scattering pattern, with bulk diffusing particles.

In some embodiments, the output coupling element may be constructed so that the degree to which light is extracted is uniform across the output coupling element. In other embodiments, the output coupling element may be constructed so that the degree to which light is extracted out of the controlled transmission mirror is not uniform across the output coupling element. For example, in the embodiment of output coupling element 528 illustrated in FIG. 5A, the density of diffusing particles 528a may be varied across the output coupling element 528 so that a higher fraction of light can be extracted from some portions of the output coupling element 528 than others. In the illustrated embodiment, the density of diffusing particles 528a is higher at the left side of the output coupling element 528. Likewise, the output coupling elements 548, 568, 586, illustrated in FIGS. 5B-5D, may be designed and shaped so that a higher fraction of light can be extracted from some portions of the output coupling elements 548, 568, 586 than from other portions. The provision of non-uniformity in the extraction of the light from the controlled transmission mirror, for example extracting a smaller fraction of light from portions of the controlled transmission mirror that contain more light and extracting a higher fraction of light from portions of the controlled transmission mirror that contain less light, may result in a more uniform brightness profile in the illumination light propagating towards the LC panel.

The number of bounces made by light within the controlled transmission mirror, and therefore, the uniformity of the extracted light, may be affected by the reflectivity of both the input coupling element and the output coupling element. The trade-off for uniformity is brightness loss caused by absorption in the input coupling element, the multilayer reflector and the output coupling element. This absorption loss may be reduced by proper choice of materials and material processing conditions.

Figure 6A:
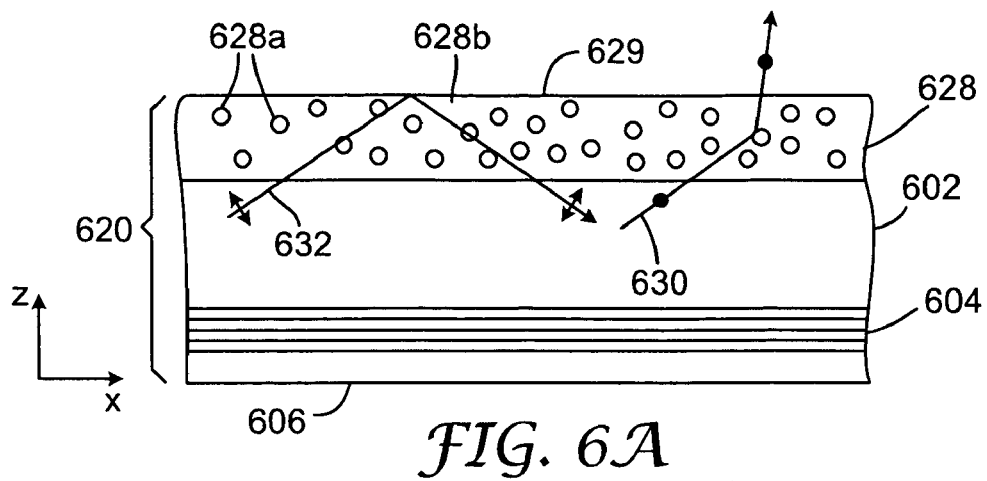
FIG. 6A schematically illustrates a cross-sectional view of an embodiment of a polarization sensitive controlled transmission mirror, according to principles of the present invention.

In some exemplary embodiments, the controlled transmission mirror may be polarization sensitive, so that light in one polarization state is preferentially extracted from the mixing cavity. A cross-section through one exemplary embodiment of a polarization sensitive controlled transmission mirror 620 is schematically illustrated in FIG. 6A. The controlled transmission mirror 620 comprises an optional substrate 602, a multilayer reflector 604, an input coupling element 606 and a polarization sensitive output coupling element 628. A three-dimensional coordinate system is used here to clarify the following description. The axes of the coordinate system have been arbitrarily assigned so that the controlled transmission mirror 620 lies parallel to the x-y plane, with the z-axis having a direction through the thickness of the controlled transmission mirror 620. The lateral dimension shown in FIG. 6A is parallel to the x-axis, and the y-direction extends in a direction perpendicular to the drawing.

In some embodiments, the extraction of only one polarization of the light propagating within the substrate 602 is effected by the output coupling element 628 containing two materials, for example different polymer phases, at least one of which is birefringent. In the illustrated exemplary embodiment, the output coupling element 628 has scattering elements 628a, formed of a first material, embedded within a continuous matrix 628b formed of a second material. The refractive indices for the two materials are substantially matched for light in one polarization state and remain unmatched for light in an orthogonal polarization state. Either or both of the scattering elements 628a and the matrix 628b may be birefringent.

If, for example, the refractive indices are substantially matched for light polarized in the x-z plane, and the refractive indices of the first and second materials are $n_1$ and $n_2$ respectively, then we have the condition $n_{1x} \approx n_{1z} \approx n_{2x} \approx n_{2z}$ holds, where the subscripts x and z denote the refractive indices for light polarized parallel to the x and z axes respectively. If $n_{1y} \neq n_{2y}$, then light polarized parallel to the y-axis, for example light 630, may be scattered within the output coupling element 628 and pass out of the controlled transmission mirror 620. The orthogonally polarized light, for example light ray 632, polarized in the x-z plane, remains substantially unscattered on passing within the output coupling element 620 because the refractive indices for this polarization state are matched. Consequently, if the light 632 is incident on the top surface 629 of the output coupling element 628 at an angle equal to, or greater than, the critical angle, $\theta_c$, of the continuous phase 628b, the light 632 is totally internally reflected at the surface 629, as illustrated.

To ensure that the light extracted from the output coupling element 628 is well polarized, the matched refractive indices are preferably matched to within at least ±0.05, and more preferably matched to within ±0.01. This reduces the amount of scatter for one polarization. The amount by which the light in the y-polarization is scattered is dependent on a number of factors, including the magnitude of the index mismatch, the ratio of one material phase to the other and the domain size of the disperse phase. Preferred ranges for increasing the amount by which the y-polarized light is forward scattered within the output coupling element 628 include a refractive index difference of at least about 0.05, a particle size in the range of about 0.5 μm to about 20 μm and a particle loading of up to about 10% or more.

Figure 6B:
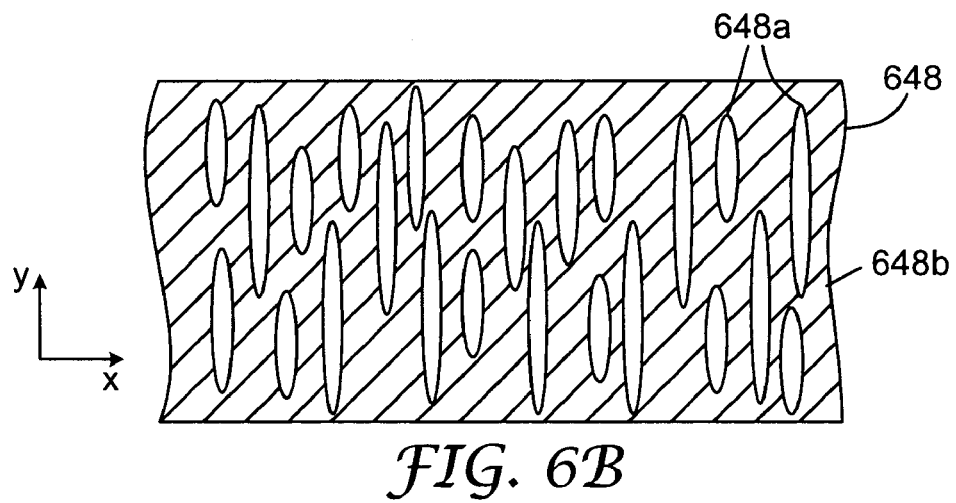
FIGS. 6B and 6C schematically illustrate different embodiments of polarization-sensitive output coupling elements according to principles of the present invention.

Different arrangements of a polarization-sensitive output coupling element are available. For example, in the embodiment of output coupling element 648, schematically illustrated in FIG. 6B, the scattering elements 648a constitute a disperse phase of polymeric particles within a continuous matrix 648b. Note that this figure shows a cross-sectional view of the output coupling element 648 in the x-y plane. The birefringent polymer material of the scattering elements 648a and/or the matrix 648b is oriented, for example by stretching in one or more directions. Disperse phase/continuous phase polarizing elements are described in greater detail in co-owned U.S. Pat. Nos. 5,825,543 and 6,590,705, both of which are incorporated by reference.

Figure 6C:
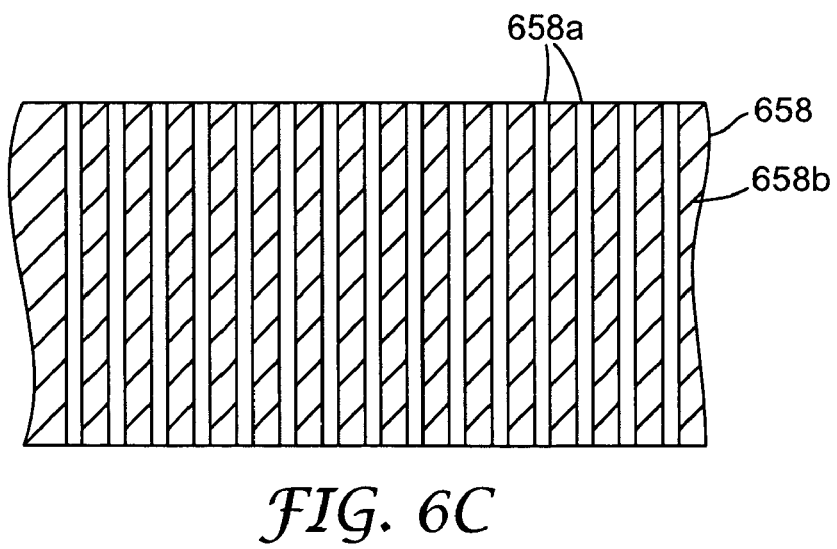

Another embodiment of output coupling element 658 is schematically illustrated in cross-section in FIG. 6C. In this embodiment, the scattering elements 658a are provided in the form of fibers, for example polymer fibers or glass fibers, in a matrix 658b. The fibers 658a may be isotropic while the matrix 658b is birefringent, or the fibers 658a may be birefringent while the matrix 658b is isotropic, or the fibers 658a and the matrix 658b may both be birefringent. The scattering of light in the fiber-based, polarization sensitive output coupling element 658 is dependent, at least in part on the size and shape of the fibers 658a, the volume fraction of the fibers 658a, the thickness of the output coupling element 658, and the degree of orientation, which affects the amount of birefringence. Different types of fibers may be provided as the scattering elements 658a. One suitable type of fiber 658a is a simple polymer fiber formed of one type of polymer material that may be isotropic or birefringent. Examples of this type of fiber 658a disposed in a matrix 658b are described in greater detail in U.S. patent application Ser. No. 11/068,159, incorporated by reference. Another example of polymer fiber that may be suitable for use in the output coupling element 658 is a composite polymer fiber, in which a number of scattering fibers formed of one polymer material are disposed in a filler of another polymer material, forming a so-called "islands-in-the-sea" structure. Either or both of the scattering fibers and the filler may be birefringent. The scattering fibers may be formed of a single polymer material or formed with two or more polymer materials, for example a disperse phase in a continuous phase. Composite fibers are described in greater detail in U.S. patent application Ser. No. 11/068,158, and U.S. patent application Ser. No. 11/068,157, both of which are incorporated by reference.

It will be appreciated that the input coupling element may also be polarization sensitive. For example, where unpolarized light is incident on the controlled transmission mirror, a polarization-sensitive scattering input coupling element may be used to scatter light of one polarization state into the controlled transmission mirror, allowing the light in the orthogonal polarization state to be reflected by the multilayer reflector back to the base reflector. The polarization of the reflected light may then be mixed before returning to the controlled transmission mirror. Thus, the input coupling element may permit light in substantially only one polarization state to enter the controlled transmission mirror. If the different layers of the controlled transmission mirror maintain the polarization of the light, then substantially only one polarization of light may be extracted from the controlled transmission mirror, even if a non-polarization-sensitive output coupling element is used. Both the input and output coupling elements may be polarization sensitive. Any of the polarization sensitive layers used as an output coupling element may also be used as an input coupling element.

Figure 7A:
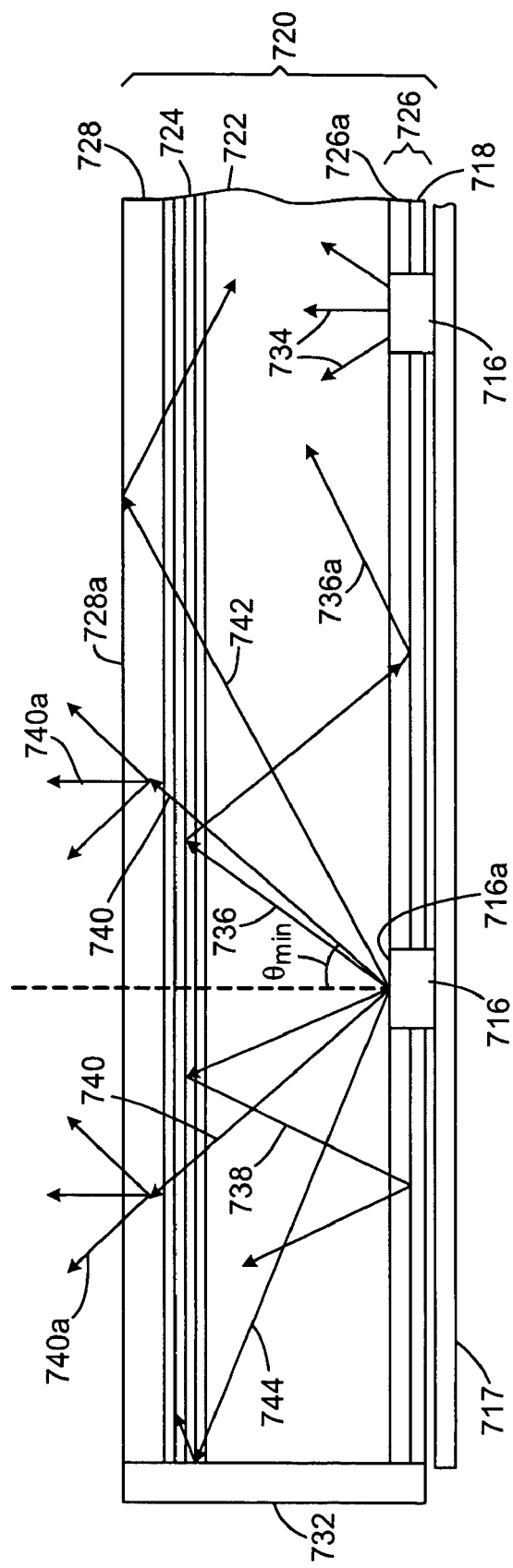
FIGS. 7A-7C schematically illustrate cross-sectional views of parts of other embodiments of a controlled transmission mirror, in which the light source emits light within the controlled transmission mirror, according to principles of the present invention.

In other embodiments of controlled transmission mirror, particularly suitable for quasi-point sources such as light emitting diodes (LEDs), the light sources may be located within the controlled transmission mirror itself. One exemplary embodiment of such an approach is schematically illustrated in cross-section in FIG. 7A. The controlled transmission mirror 720 has a substrate 722, a multilayer reflector 724, and an output coupling element 728. The lower surface of the substrate 722 may be provided with a diverting layer 726. Side reflectors 732 may be provided around the edge of the light mixing layer 720. The side reflectors may be used to reflect any light that propagates out of the peripheral edge of the substrate 722.

Figure 7B:
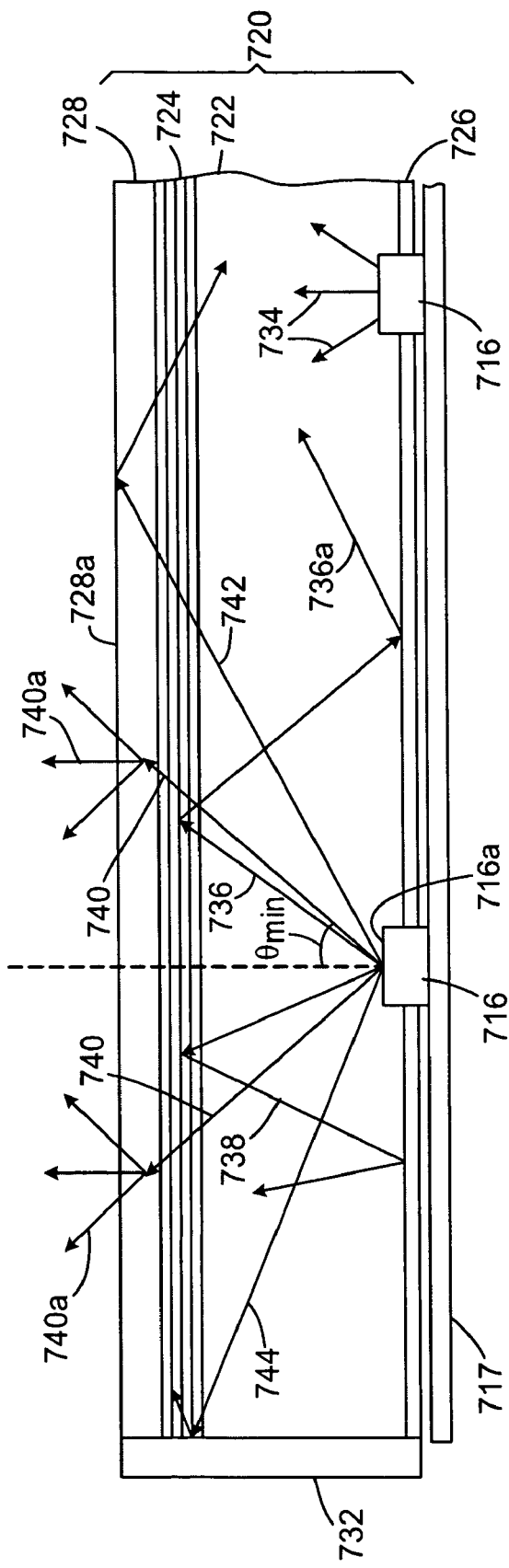

The diverting layer 726 may comprise a transmissive redirecting layer 726a that redirects light, for example any of the layers discussed above for use as an input coupling element, including bulk or surface diffusers or a structured surface. The transmissive redirecting layer 726a may be used with a base reflector 718 that reflects the light that has been transmitted through the transmissive redirecting layer 726a. The base reflector 718 may be any suitable type of reflector. The base reflector 718 may be a specular or a diffuse reflector and may be formed from, e.g., a metalized reflector or a MOF reflector. The base reflector 718 may be attached to the transmissive redirecting layer 726a, as illustrated, or may be separate from the transmissive redirecting layer 726a. The diverting layer 726 is not referred to as an input coupling element in this embodiment, however, because it is not used for coupling the light into the controlled transmission mirror 720. Different configurations of the diverting layer 726 are possible. In some exemplary embodiments, for example as is schematically illustrated in FIG. 7B, the diverting layer 726 may simply comprise a diffuse reflector.

Light sources 716, for example LEDs, although other types of light sources may also be used, are arranged so that a light emitting surface 716a at least directly faces the substrate 722, or may even be recessed within the substrate 722. Thus, the light emitting surface 716a is disposed between the diverting layer 726 and the multilayer reflector 724. In this embodiment, light 734 from the light sources 716 enters the substrate 722 without being transmitted through the diverting layer 726 located at the lower surface of the substrate 722. A refractive index-matching material, for example a gel, may be provided between the light emitting surface 716 and the substrate 722 to reduce reflective losses and increase the amount of light coupled into the substrate 722 from the light source 716.

The light sources 716 may be arranged on a carrier 717. The carrier 717 may optionally provide electrical connections to the light sources 716 and may also optionally provide a thermal pathway for cooling the light sources 716. Different approaches for mounting the light sources 716 on a carrier 717 are discussed in greater detail in co-owned U.S. patent application Ser. No. 10/858,539, incorporated herein by reference.

The light sources 716 may all emit light having the same spectral content, or different light sources 716 may emit light having different spectral content. For example, one light source 716 may emit blue light while another light source 716 emits green light and a third light source 716 emits red light. LEDs are particularly suited for use where different light sources produce light at different wavelengths. The effect of lateral light spreading within the controlled transmission mirror may be used to mix light from differently colored light sources 716 so that the light emitted from the controlled transmission mirror is an effective mixture of all spectral components emitted by the light sources 716.

Even when the light sources 716 directly inject light into the substrate 722 without passing through an input coupling element, the multilayer reflector 724 still controls the minimum angle, $\theta_{min}$, at which light propagating within the substrate 722 may exit out of the controlled transmission mirror 720. Some light, exemplified by light rays 736 and 738, is emitted into the substrate 722 from the light source 716 at an angle less than $\theta_{min}$, and is, therefore, reflected by the multilayer reflector 724. Some of the reflected light, for example ray 736, may be diverted by the diverting layer 726 before or after incidence at the base reflector 718, and so is reflected back into the substrate at an angle greater than $\theta_{min}$, as ray 736a. Consequently, some of the light, e.g. ray 736a, is diverted into an angular range that permits subsequent transmission through the multilayer reflector after only one reflection form the multilayer reflector 724. Another portion of the reflected light, for example light ray 738, may not be diverted at the diverting layer 726 and is, therefore, reflected from the base reflector 718 at an angle that will result in another reflection at the multilayer reflector 724.

Some of the light emitted from the light sources 716, exemplified by light rays 740 and 742, is emitted into the substrate 722 from the light source 716 at an angle equal to or greater than $\theta_{min}$, and is, therefore, transmitted through the multilayer reflector 724. Some of the transmitted light, for example ray 740, may be diverted by the output coupling element 728, and so is transmitted out of the controlled transmission mirror 720 as light 740a. Another portion of the transmitted light, for example ray 742, may pass through the output coupling element 728 without being diverted and, if it is incident at the upper surface 728a of the output coupling element 728 at an angle greater than the critical angle, $\theta_c$, is totally internally reflected back towards the substrate 722.

Some of the light 744 propagating within the substrate 722 may be reflected at the edge reflector 732. The edge reflector 732 may be used to reduce the amount of light escaping from the edge of the substrate 722, and thus reduces losses.

Figure 7C:
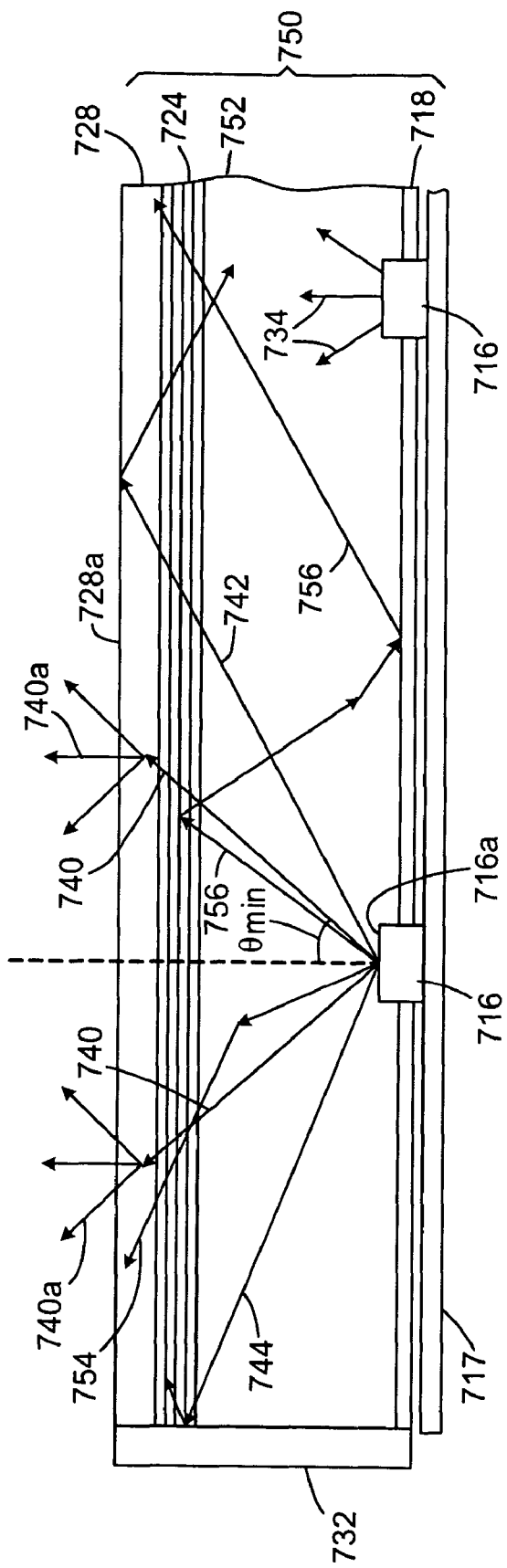

Another embodiment of a controlled transmission mirror 750 is schematically illustrated in FIG. 7C, in which the substrate 752 also operates as a diverting layer. In this embodiment, the substrate 752 contains some diffusing particles so that some of the light passing therethrough is diverted. In one example, light beam 754, which propagates from the light source 716 at an angle less than $\theta_{min}$ may be diverted within the substrate 752 so as to be incident on the multilayer reflector 724 at an angle greater than $\theta_{min}$. In another example, light beam 756, which is reflected by the multilayer reflector 724, may be diverted within the substrate 752 so as to be reflected by the base reflector 718 at an angle greater than $\theta_{min}$.

EXAMPLES

Example 1

A structure was formed by laminating films of a multilayer polymer reflecting film, 3M Vikuiti™-brand ESR film, available from 3M Company, St. Paul, Minn., to both sides of a polycarbonate plate having a thickness of 3 mm using an optically clear pressure sensitive adhesive (PSA). The outer surfaces of the ESR film were then covered with strips of 3M Scotch™-brand Magic Tape. A pen laser, emitting polarized light having a wavelength of about 640 nm, was used to illuminate the structure at normal incidence to the ESR films. The size of the light beam incident on the structure was about 2 mm×3 mm.

At the output side of the structure, there was a dark central spot, corresponding to the forbidden angular region, that was elliptical in shape, having major and minor axes of 7 mm and 6 mm respectively. When a birefringent quartz plate was inserted into the laser beam with its optic axis placed at about 45° to the direction of polarization, the light pattern on the output side of the structure changed shape to a circular pattern.

The outer diameter of the light pattern, corresponding to light propagating through the substrate at $\theta_{max}$, was elliptical with major and minor axes of 16 mm and 15 mm respectively. The value of $\theta_{max}$ is relatively low in this example because the refractive index of the polycarbonate plate (n=1.58) was significantly higher than that of the Magic Tape.

A faint secondary ring, having an inner diameter about 25 mm, was also observed and was believed to arise from a secondary reflection.

Example 2

A film of ESR was laminated to one side of an acrylic plate, having a thickness of 3 mm, using an optically clear PSA, and the outer surface of the ESR was covered with strips of Magic Tape. The laser pen was used to illuminate the side of the laminate with the ESR film with a light beam 2 mm×3 mm. The resulting dark central spot on the output side of the laminate had dimensions of about 8 mm×9 mm.

The outer diameter of the output illumination pattern was not well defined, but was very large, at least 50 mm. This result is consistent with a higher value of $\theta_{max}$ than in Example 1, since there was close matching between the refractive indices of the Magic Tape and the acrylic plate (n~1.49 in each case).

Example 3

A structure similar to that of Example 1 was constructed, except that the polycarbonate plate had a thickness of 12 mm. When normally illuminated by the pen light with an input beam of 2 mm×3 mm, the structure produced an oval output light pattern, about 26 mm×28 mm. The outer diameter of the light pattern, defined by $\theta_{max}$, was about 60 mm in diameter. The low intensity of the light at the outer edge of the pattern made it difficult to clearly discern the outer edge of the pattern.

A controlled transmission mirror as described herein is not restricted to use for illuminating a liquid crystal display panel. The controlled transmission mirror may also be used wherever discrete light sources are used to generate light and it is desirable to have uniform illumination out of a panel that includes one of more of the discrete light sources. Thus, the controlled transmission mirror may find use in solid state space lighting applications and in signs, illuminated panels and the like.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical system, comprising:
an image-forming panel;
at least a first light source disposed behind the image-forming panel; and
in order from the first light source towards the image-forming panel, a first diffuser, a first multilayer reflector and a second diffuser, at least some light from the first light source passing through the first diffuser, the first multilayer reflector and the second diffuser towards the image-forming panel, an intensity profile of light that has passed out of the second diffuser from the first light source having a minimum at a position along an axis from the first light source normal to a major surface of the first multilayer reflector.

2. A system as recited in claim 1, further comprising a substrate disposed between the first and second diffusers, the substrate being substantially transparent to the light from the first light source.

3. A system as recited in claim 1, further comprising a base reflector, the first light source being disposed between the base reflector and the first diffuser.

4. A system as recited in claim 1, wherein the first diffuser comprises at least one of a bulk diffuser and a surface diffuser.

5. A system as recited in claim 1, wherein the second diffuser comprises at least one of a bulk diffuser and a surface diffuser.

6. A system as recited in claim 1, further comprising at least one brightness enhancing layer disposed between the second diffuser and the image-forming panel.

7. A system as recited in claim 1, wherein the second diffuser preferentially diffuses light of substantially only one polarization state.

8. A system as recited in claim 7, wherein the second diffuser comprises a disperse polymeric phase in a continuous polymeric matrix, at least one of the disperse polymeric phase and the continuous polymeric matrix comprising birefringent polymeric material.

9. A system as recited in claim 7, wherein the output coupling element comprises fibers disposed within a polymeric matrix, at least one of the fibers and the polymeric matrix comprising birefringent polymeric material.

10. A system as recited in claim 1, wherein the at least a first light source comprises at least a first light source capable of emitting light at a first wavelength and at least a second light source capable of emitting light at a second wavelength different from the first wavelength.

* * * * *